United States Patent
Kimura et al.

(10) Patent No.: US 7,300,291 B2
(45) Date of Patent: Nov. 27, 2007

(54) CARD CONNECTOR ADAPTED FOR CARDS HAVING DIFFERENT WIDTH DIMENSIONS

(75) Inventors: Akira Kimura, Tokyo (JP); Takamitsu Wada, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/364,657

(22) Filed: Feb. 28, 2006

(65) Prior Publication Data

US 2006/0196781 A1 Sep. 7, 2006

(30) Foreign Application Priority Data

Mar. 1, 2005 (JP) ............................. 2005-056205

(51) Int. Cl.
*H01R 13/44* (2006.01)

(52) U.S. Cl. ...................................... 439/131; 439/630

(58) Field of Classification Search ................ 439/159, 439/630, 310, 333
See application file for complete search history.

(56) References Cited

U.S. PATENT DOCUMENTS 6,328,605 B1 * 12/2001 Walker et al. .............. 439/631
6,641,413 B2 * 11/2003 Kuroda ....................... 439/159
7,090,537 B1 * 8/2006 Nakamura .................. 439/630
2005/0079767 A1 * 4/2005 Ho et al. .................... 439/630
2005/0287855 A1 * 12/2005 Taguchi ...................... 439/159

FOREIGN PATENT DOCUMENTS

| CN | 2662470 Y | 12/2004 |
| JP | 200067996 | 3/2000 |
| JP | 2000-277200 | 10/2000 |
| JP | 2004-71257 | 3/2004 |
| JP | 2006-120476 | 5/2006 |

* cited by examiner

*Primary Examiner*—James R. Harvey
*Assistant Examiner*—Travis Chambers
(74) *Attorney, Agent, or Firm*—Collard & Roe, P.C.

(57) ABSTRACT

In a connector including a housing having an entrance for receiving a connection object and a contact held by the housing for connection to the connection object, a guide member is coupled to the entrance for guiding the connection object in a first direction. A guide portion is disposed near the entrance in the housing and at a first portion in a second direction perpendicular to the first direction. By the use of a moving force of the connection object, the guide portion is adapted to guide the connection object toward a second portion that allows the connection object to pass therethrough.

7 Claims, 12 Drawing Sheets

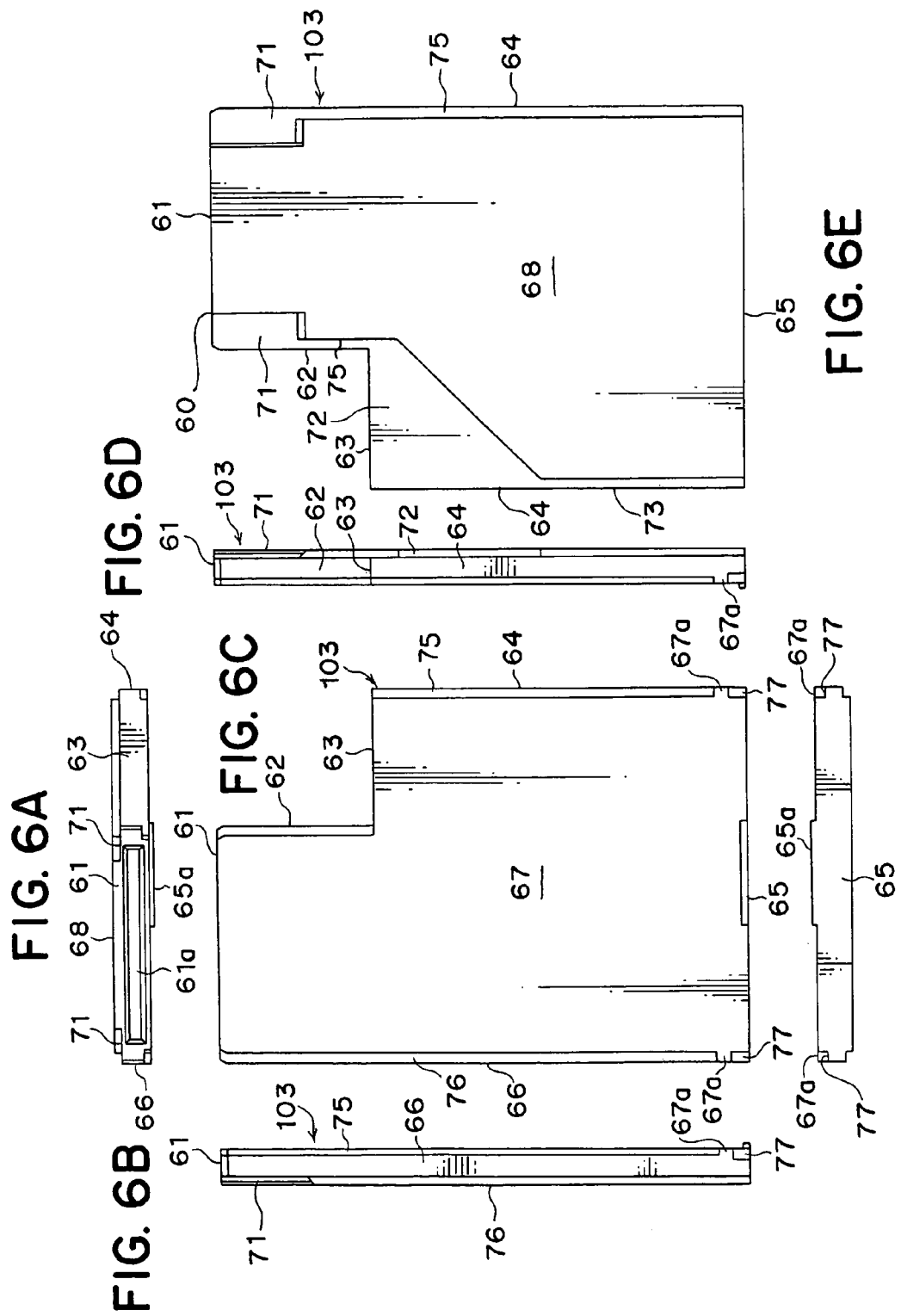

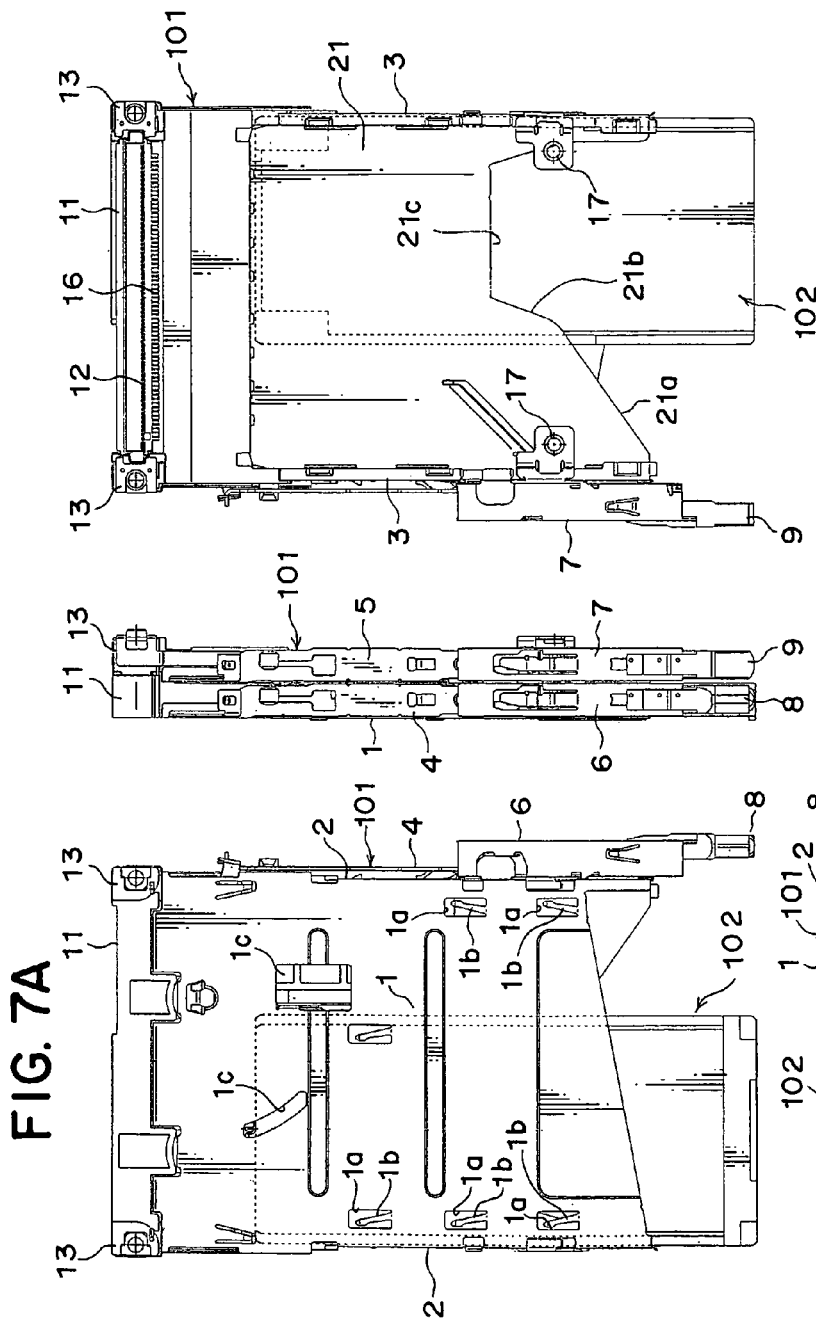

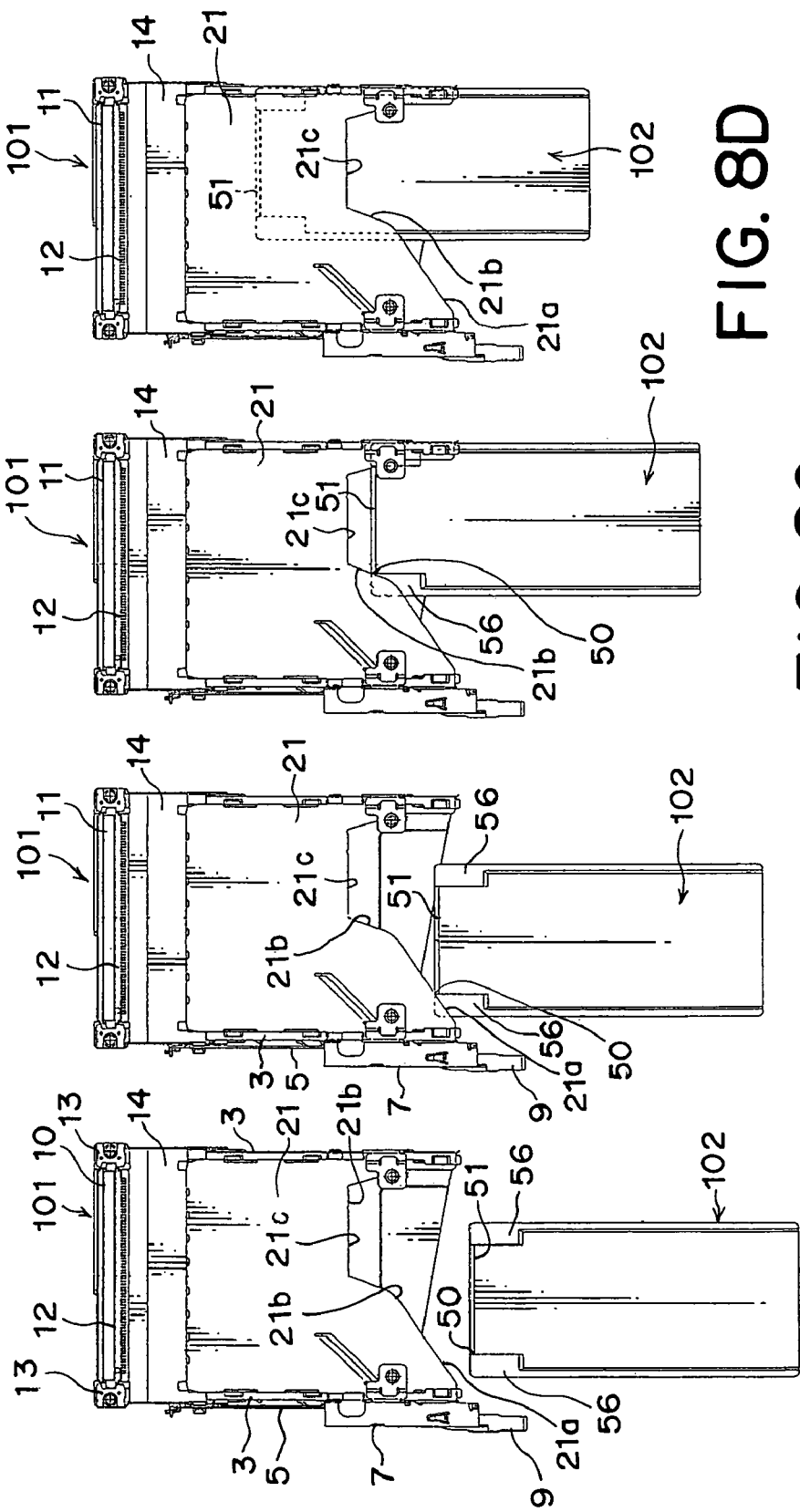

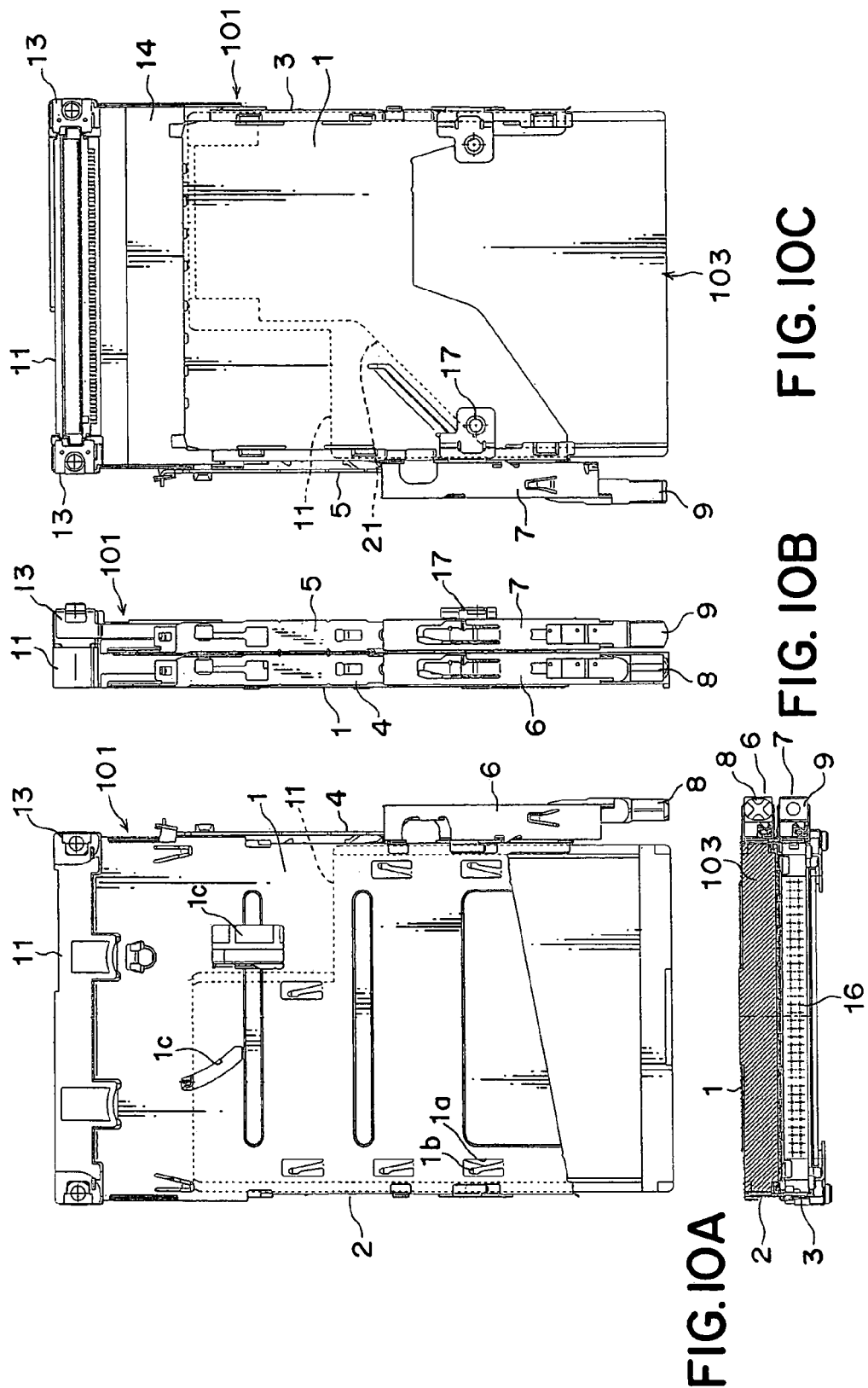

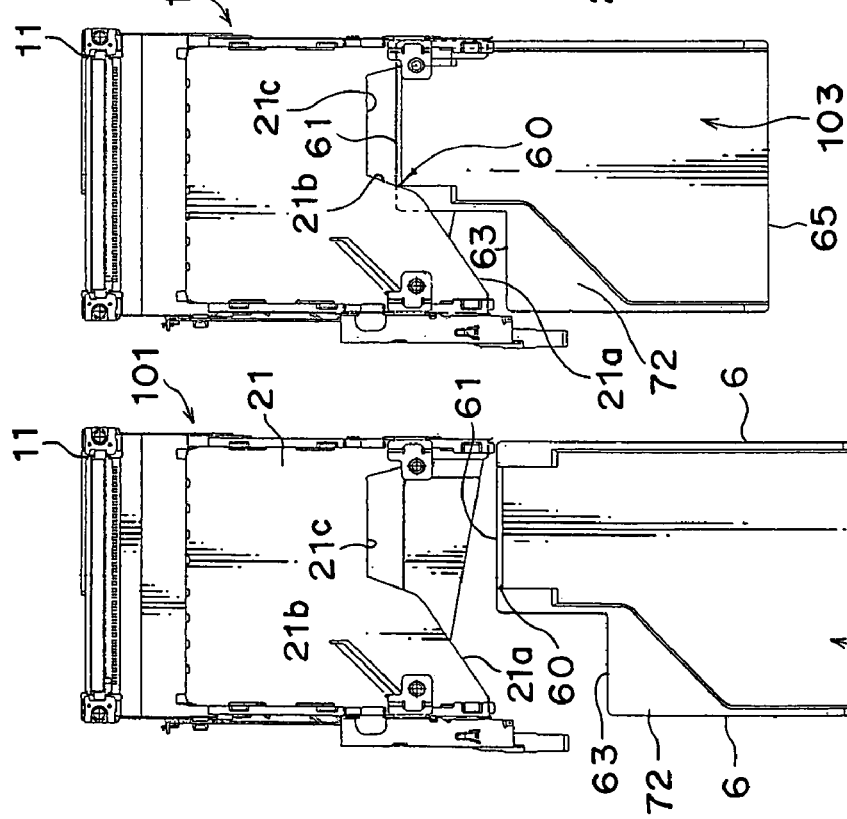

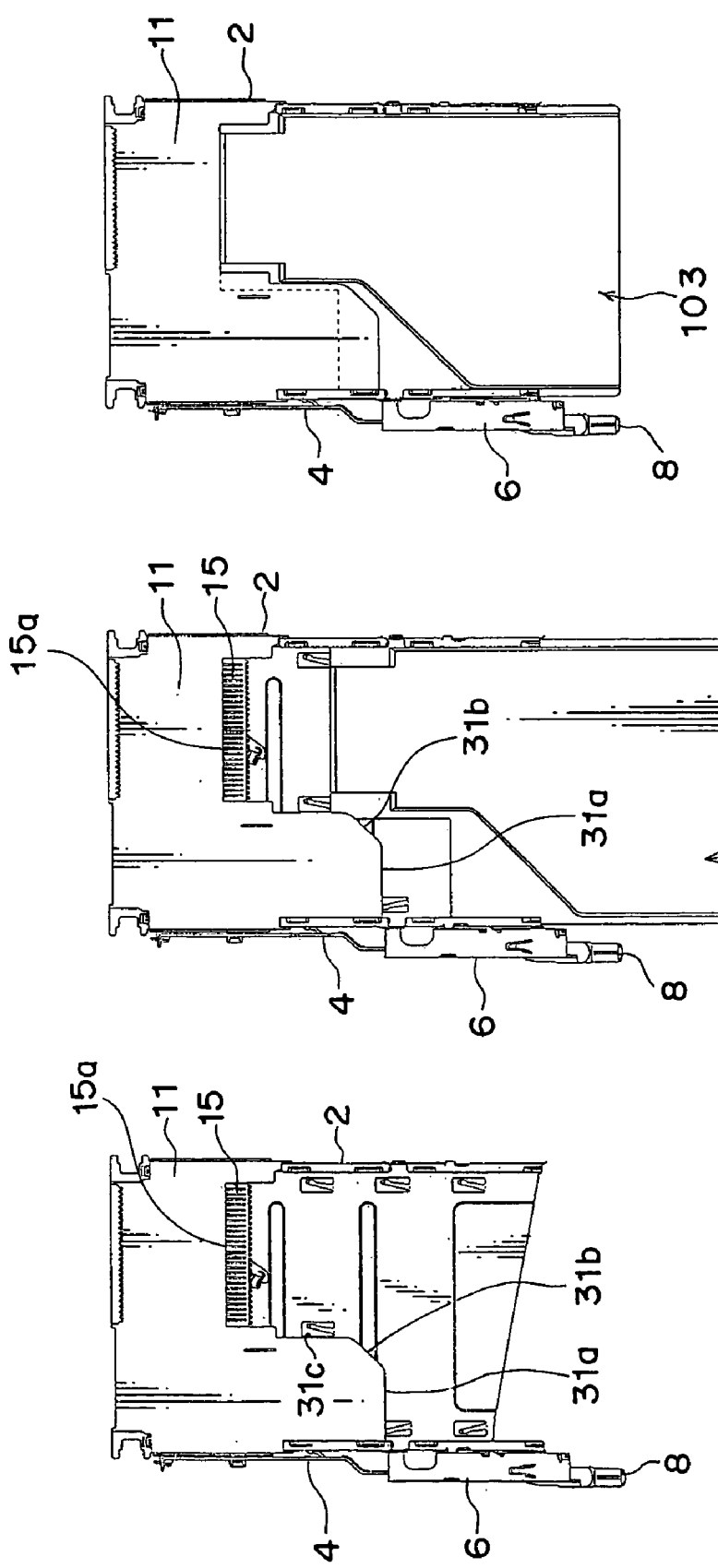

CARD CONNECTOR ADAPTED FOR CARDS HAVING DIFFERENT WIDTH DIMENSIONS

This application claims priority to prior Japanese patent application JP 2005-56205, the disclosure of which is incorporated herein by reference.

BACKGROUND OF THE INVENTION

This invention relates to a card connector for connecting a card such as an express card or the like.

Recently, cards called express cards having a function similar to that of PC cards have been proposed and available on the market. There are, however, two kinds of express cards having different width dimensions and, therefore, it is not possible for a card connector to handle those two kinds of express cards if the card connector is simply applied with a technique of an existing card connector designed for connecting a PC card.

Japanese Unexamined Patent Application Publication (JP-A) No. 2000-67996, for example, discloses one example of a card connector that is used for loading and then ejecting a card such as a memory card. The card connector comprises a connector body having two panels defining a card space for receiving therein a memory card and an eject mechanism coupled to the connector body. When the eject mechanism is operated, the memory card is ejected from the card space. Accordingly, a user can easily remove the memory card from the card connector. However, this card connector cannot handle those cards having different width dimensions like the express cards.

SUMMARY OF THE INVENTION

It is therefore an object of this invention to provide a card connector that can handle different kinds of cards having different width dimensions.

It is another object of this invention to provide a card connector having excellent insertability that can easily guide a card at the time of its insertion.

It is still another object of this invention to provide a card connector that enables connection of an express card.

Other objects of the present invention becomes clear as the description proceeds.

According to an aspect of the present invention, there is provided a connector comprising a housing having an entrance for receiving a connection object, a contact held by the housing for connection to the connection object, a guide member coupled to the entrance for guiding the connection object in a first direction, and a guide portion disposed near the entrance in the housing and at a first portion in a second direction perpendicular to the first direction, the guide portion, by the use of a moving force of the connection object, adapted to guide the connection object toward a second portion that allows the connection object to pass therethrough.

According to another aspect of the present invention, there is provided a connector capable of connecting a selected connection object selected from a first and a second connection object having different dimensions, the connector comprising a housing having an entrance for receiving the selected connection object, a contact held by the housing, a guide member coupled to the entrance for guiding movement of the selected connection object in a first direction, and a guide portion disposed near the entrance in the housing and at a first portion in a second direction perpendicular to the first direction, the guide portion, by the use of a moving force of the selected connection object, adapted to guide the selected connection object toward a second portion that allows the selected connection object to pass therethrough.

According to still another aspect of the present invention, there is provided a connector adapted to connect two kinds of different connection objects, the connector comprising a contact, a housing holding the contact, and a guide member for guiding insertion of the connection object, the guide member having a plate portion formed with a guide portion, wherein, when one of the connection objects is inserted, the guide portion abuts a to-be-guided portion of the one of the connection objects so as to move the one of the connection objects to a connecting position with the contact, and, when the other of the connection objects is inserted at the connecting position, the guide portion does not abut the other of the connection objects, while, when the other of the connection objects is inserted so as to be offset from the connecting position, the guide portion abuts a to-be-guided portion of the other of the connection objects so as to move the other of the connection objects to the connecting position.

BRIEF DESCRIPTION OF THE DRAWINGS

FIG. 6A is a front view of the same express card;

FIG. 6B is a right side view of the same express card;

FIG. 6C is a plan view of the same express card;

FIG. 6D is a left side view of the same express card;

FIG. 6E is a bottom view of the same express card;

FIG. 6F is a rear view of the same express card;

FIG. 7A is a plan view showing the state where the express card of FIGS. 4A to 4C is fitted into the card connector of FIGS. 1 to 3D;

FIG. 7B is a side view of the same;

FIG. 7C is a bottom view of the same;

FIG. 7D is a front view of the same;

FIGS. 8A to 8D are diagrams sequentially showing the states where the express card of FIGS. 4A and 4B is on the way to be fitted into the card connector of FIGS. 1 to 3D;

FIG. 10A is a plan view showing the state where the express card of FIGS. 5A and 5B is fitted into the card connector of FIGS. 1 to 3D;

FIG. 10B is a side view of the same;

FIG. 10C is a bottom view of the same;

FIG. 10D is a front view of the same;

FIGS. 11A to 11D are diagrams sequentially showing the states where the express card of FIGS. 5A and 5B is on the way to be fitted into the card connector of FIGS. 1 to 3D; and FIGS. 12A to 12C are diagrams sequentially showing the states where the express card of FIGS. 5A and 5B is on the way to be fitted into the upper card slot of the card connector of FIGS. 1 to 3D, wherein only the upper card slot is seen from its bottom.

DESCRIPTION OF THE PREFERRED EMBODIMENT

Figure 1:
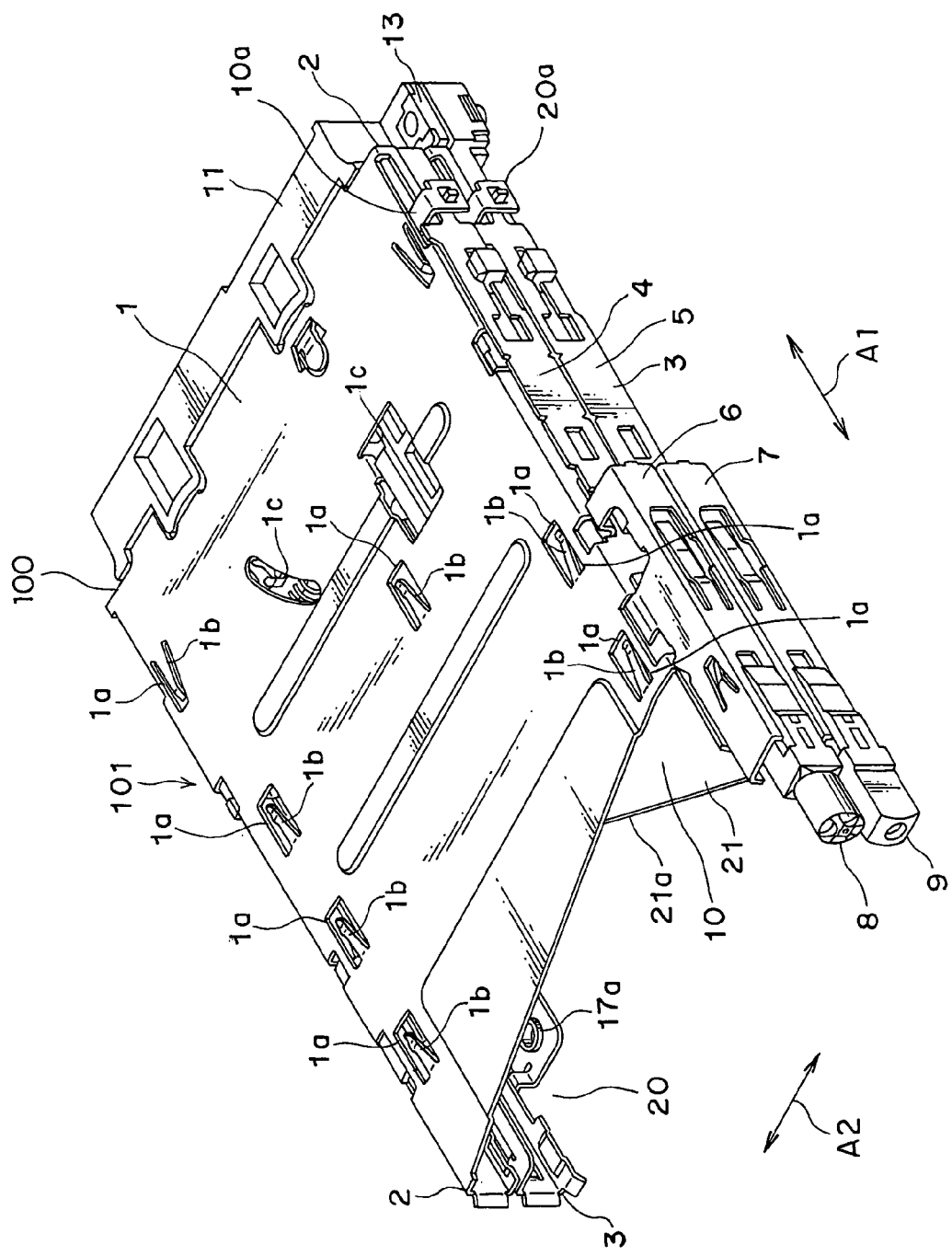
FIG. 1 is a perspective view, seen from above, of a card connector according to an embodiment of this invention.
Figure 2:
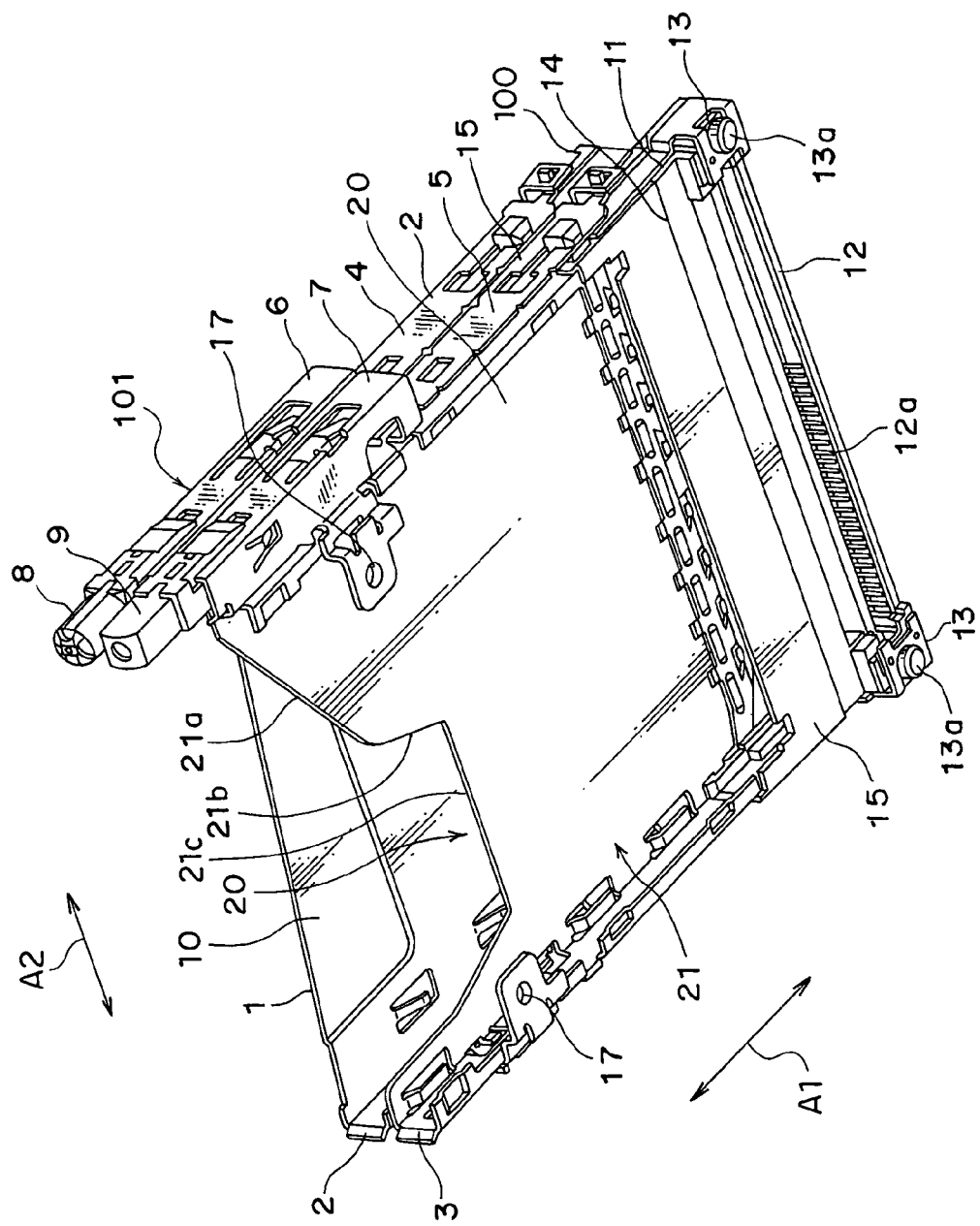
FIG. 2 is a perspective view, seen from below, of the card connector shown in FIG. 1.

Referring to FIGS. 1, 2, and 3A to 3D, description will be made about a card connector according to an embodiment of this invention.

The card connector is depicted by reference numeral 101 and comprises a housing 100 forming an outer shell and a plate portion or a partition plate 21 fixed to the housing 100. The partition plate 21 extends in a first direction A1 and a second direction A2 perpendicular to the first direction A1 and forms a guide member having a guide portion adapted to guide insertion of a card being a connection object.

The card connector has multiple card slots. That is, the housing 100 has an inner space that is divided into an upper card slot 10 and a lower card slot 20 by the partition plate 21. The upper card slot 10 is for an express card, while the lower card slot 20 is for a PC card.

The housing 100 has, on its front side, entrances for receiving cards into the card slots 10 and 20, respectively. The housing 100 further has an insulator 11 fixed to its rear portion, a cover 1 forming the upper card slot 10, a pair of first frames 2 integral with the cover 1, a pair of second frames 3 forming the lower card slot 20, a first eject mechanism 6 provided on one side of one of the first frames 2, and a second eject mechanism 7 provided on one side of one of the second frames 3 on the lower side of the first eject mechanism 6.

Figures 3A, 3B, 3C:
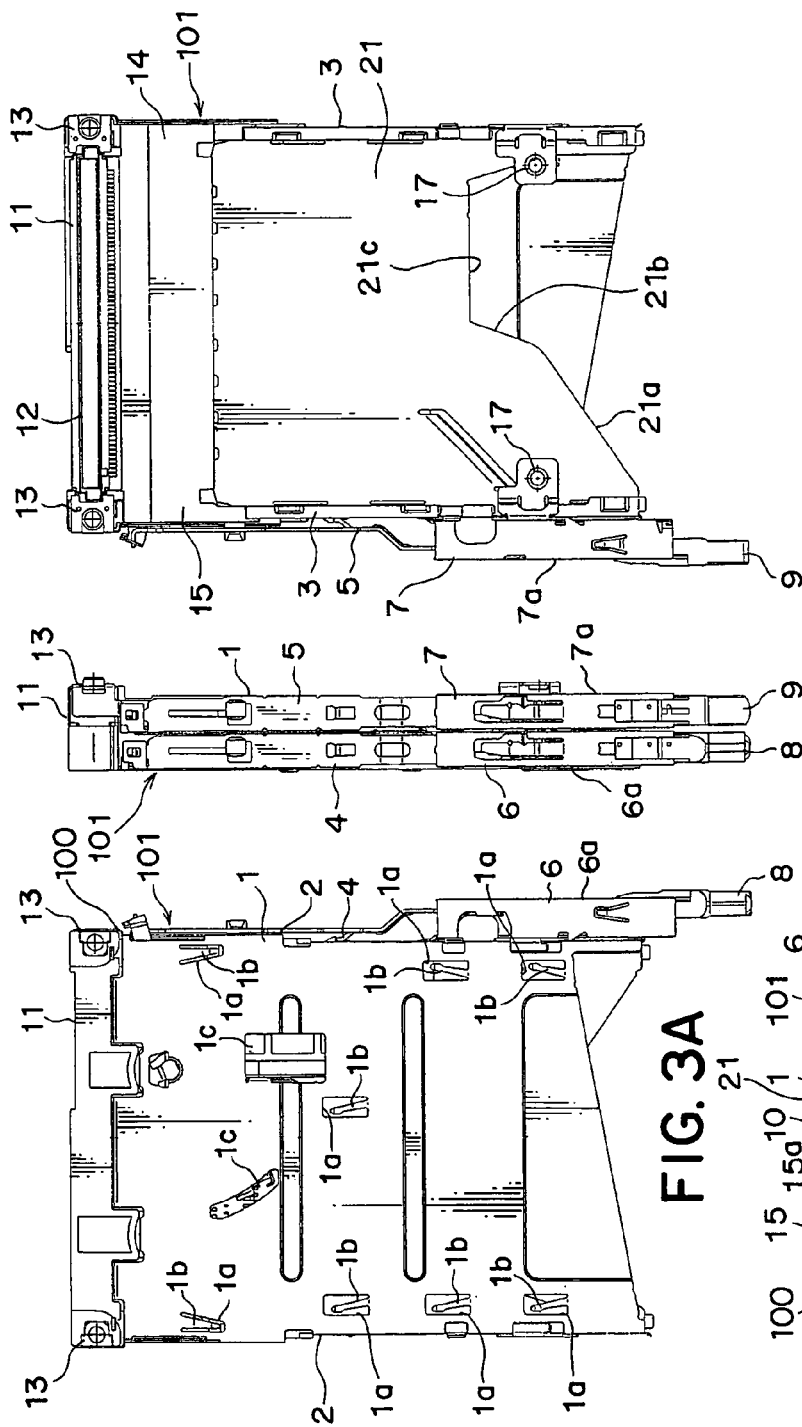
FIG. 3A is a plan view of the same card connector.
FIG. 3B is a side view of the same card connector.
FIG. 3C is a bottom view of the same card connector.
Figure 3D:
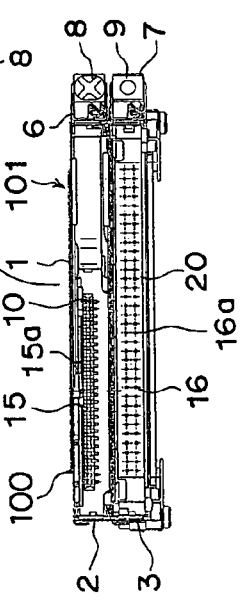
FIG. 3D is a front view of the same card connector.

The insulator 11 includes a box-shaped connector 12 having, on its lower side, contacts 12a arranged side by side. The connector 12 is open on its lower side. As best shown in FIG. 3D, the insulator 11 is provided with a first card fitting portion 15 on the side of the upper card slot 10 and with a second card fitting portion 16 on the side of the lower card slot 20. The first card fitting portion 15 is adapted for fitting to one end of an express card. Contacts 15a adapted for contacting contacts of the express card are arranged side by side in the first card fitting portion 15 so as to be offset to one side. The second card fitting portion 16 is provided with contacts 16a adapted for contacting contacts of a PC card. On both sides of the insulator 11 are provided metal fittings 13 each having a fixing hole 13a for fixation to a case of a non-illustrated body.

The cover 1 is provided at a ceiling portion defined between the first frames 2 forming the upper card slot 10. A front end of the cover 1 is inclined with respect to its width direction, while a rear end of the cover 1 is fixedly inserted into the insulator 11. The cover 1 is provided with a hole 1a and a spring piece 1b in the hole 1a, which are formed by slitting and bending a portion of the cover 1. The spring piece 1b is provided for pressing a card inserted into the card slot 10. The first frames 2 each have a generally ⊐-shape in cross section and are disposed so as to face each other inward in the width direction to thereby form guide grooves 2a for guiding the card, respectively.

The second frames 3 forming the lower card slot 20 each also have a generally ⊐-shape in cross section and are disposed so as to face each other inward in the width direction to thereby form guide grooves 3a for guiding a card, respectively. On the lower side of each second frame 3 is provided a metal fitting 17 for fixation to a case of an electronic device. Rear ends of the second frames 3 are inserted into a lower surface 14 of the insulator 11.

The partition plate 21 is disposed between the first frames 2 and the second frames 3. A front end surface of the partition plate 21 has an inclined portion 21a, as a guide portion, formed obliquely to the first and second directions A1 and A2 at a portion offset to one side from a center portion, an inclined portion 21b formed further obliquely from the inclined portion 21a, and a recessed portion 21c continuous with the inclined portion 21b and recessed in the first direction A1.

Generally, a card is inserted and removed in the first directions A1. As will be clear from later description, there is a case where the card is moved in the second direction A2 by the inclined portions 21a and 21b at the time of insertion, which improves the insertability of the card.

The first eject mechanism 6 comprises an eject bar 4, an eject button 8, and an eject cover 6a covering a coupling portion of them. The eject bar 4 has one end connected to an eject lever 10a in the card slot 10. The eject lever 10a is used for pushing out a received card.

Like the first eject mechanism 6, the second eject mechanism 7 comprises an eject bar 5, an eject button 9, and an eject cover 7a covering a coupling portion of them. The eject bar 5 has one end connected to an eject lever 20a in the card slot 20. Like the eject lever 10a, the eject lever 20a is used for pushing out a received card.

As will be described next, there are two kinds of express cards, i.e. 34-module and 54-module express cards. Hereinafter, the 34-module express card will be referred to as a "first module", while the 54-module express card will be referred to as a "second module".

A card slot of a card connector that is fittable to these two kinds of express cards changes its width dimension according to the shape of the second module such that an entrance portion is wide enough to allow entry of the 54 mm width while a deep inward side is so narrow as to only allow entry of the 34 mm width and the center positions of the wide portion and the narrow portion are offset from each other. When fitting the first module into such a card slot, the first module is fitted at an eccentric position with respect to the wide portion of the entrance portion.

Figure 4A:
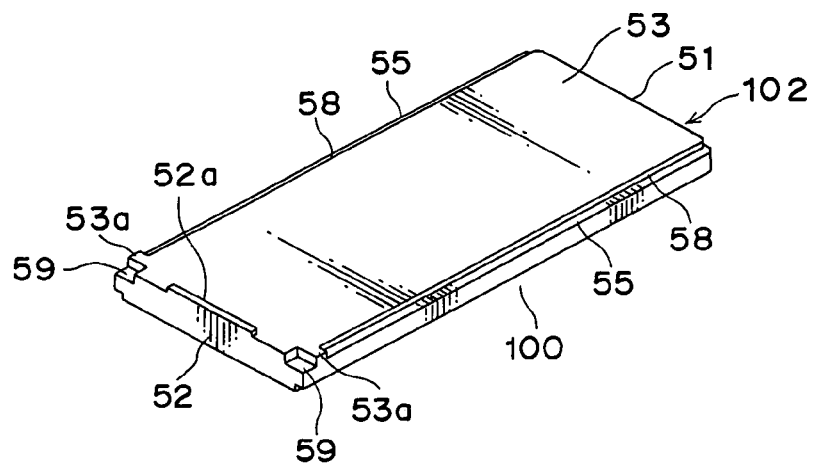
FIG. 4A is a perspective view, seen from above, of a 34-module express card.
Figure 4B:
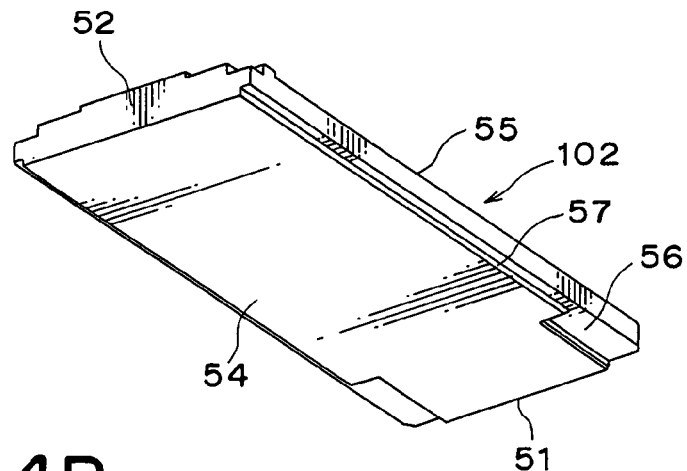
FIG. 4B is a perspective view, seen from below, of the express card shown in FIG. 4A.
Figure 4C:
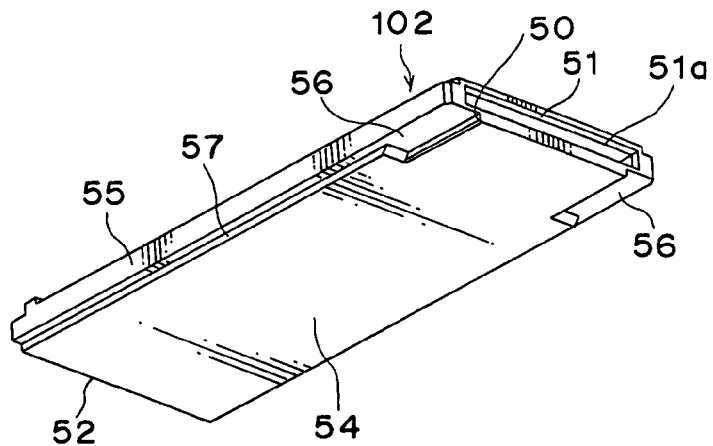
FIG. 4C is a perspective view, seen from below a fitting portion side, of the same express card.
Figure 5A:
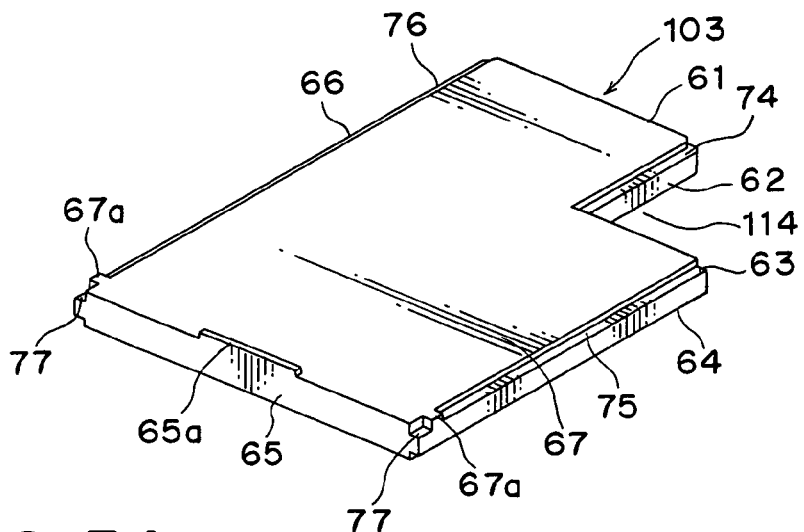
FIG. 5A is a perspective view, seen from above, of a 54-module express card.
Figure 5B:
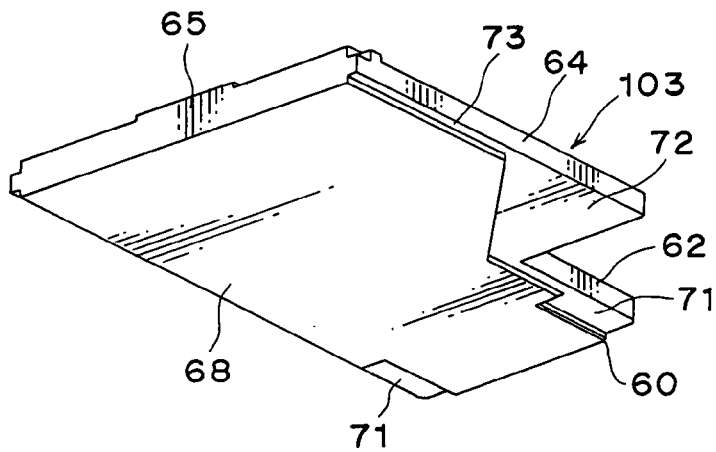
FIG. 5B is a perspective view, seen from below, of the express card shown in FIG. 5A.
Figure 5C:
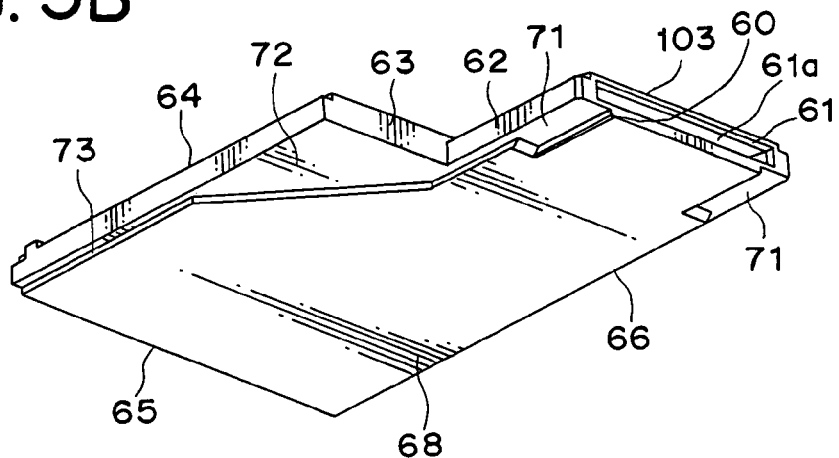
FIG. 5C is a perspective view, seen from below a fitting portion side, of the same express card.

Referring to FIGS. 4A and 4B, a first module 102 is an express card having a uniform width of 34 mm and having a fitting portion with a receiving connector at the center in the width direction. The first module 102 is rectangular and has a fitting portion 51a at one end 51 and an upright projecting portion 52a at a center portion at the other end. On an upper surface of the first module 102, grooves 58 are formed on its both sides, each extending from the one end 51 toward the other end. Each groove 58 terminates at a portion 53a. Further, on the upper surface of the first module 102 at the other end, rectangular hollows 59 are formed at corners on both sides.

On the other hand, on a lower surface of the first module 102, wide grooves (thin portions) 56 are respectively formed on its both sides at the one end 51 and, further, narrower grooves 57 are formed on the both sides so as to extend from the wide grooves 56 to reach the other end. Further, the first module 102 is formed with an edge 50 at a corner portion.

Referring to FIGS. 5A to 5C and 6A to 6F, the second module 103 has a shape such that while a fitting portion has a width of 34 mm and has the same shape as that of the first module 102, a stepped portion is formed on one side at an intermediate portion so that the width increases to 54 mm. The second module 103 has a rectangular shape with a rectangular cutout on one end side and is provided at one end 61 with a fitting portion 61a having the same width as that of the first module 102 and with an upright projecting portion 65a at a center portion at the other end. On an upper surface of the second module 103, grooves 74 and 76 are formed on both sides of the narrow fitting portion 61a, each extending from the one end 61 toward the other end. The groove 76 terminates at a portion 67a close to the other end, while the groove 74 terminates at the portion where the width increases. Further, a groove 75 is formed on one side of the wide portion. The groove 75 terminates at a portion 67a close to the other end like the groove 76. Further, on the upper surface of the second module 103 at the other end, rectangular hollows 77 are formed at corners on both sides.

On the other hand, on a lower surface of the second module 103, wide grooves 71 are respectively formed on both sides of the fitting portion at the one end 61. One of the grooves 71 extends to communicate with a groove 73 extending along the lower surface of the second module 103 to reach another end thereof. Another of the grooves 71 extends to terminate at the portion where the width increases. The second module 103 is formed with a triangular thin portion 72 where the thickness is reduced. On the inner side of the thin portion 72 is formed with an edge 60 serving as a portion to be guided.

Referring to FIGS. 7A to 7D and 9A, the insulator 11 is provided on the deep inward side of the upper and lower card slots 10 and 20. The upper card slot 10 is provided with the fitting portion 15 that can be connected to either of the fitting portions 51a and 61a of the first and second modules 102 and 103. The center position of the fitting portion 15 is offset from the center position of the entrance portion in order to enable fitting to the second module 103.

Referring to FIGS. 8A to 8D and 9A to 9C, description will be made about an operation when inserting the first module 102 being the first connection object into the card connector 101.

As shown in FIG. 8A, when inserting the first module 102 into the card slot 10, the fitting portion 51a of the first module 102 is inserted in the state where a space is provided on one side with respect to the width of the entrance portion of the card slot 10.

Figure 9A:
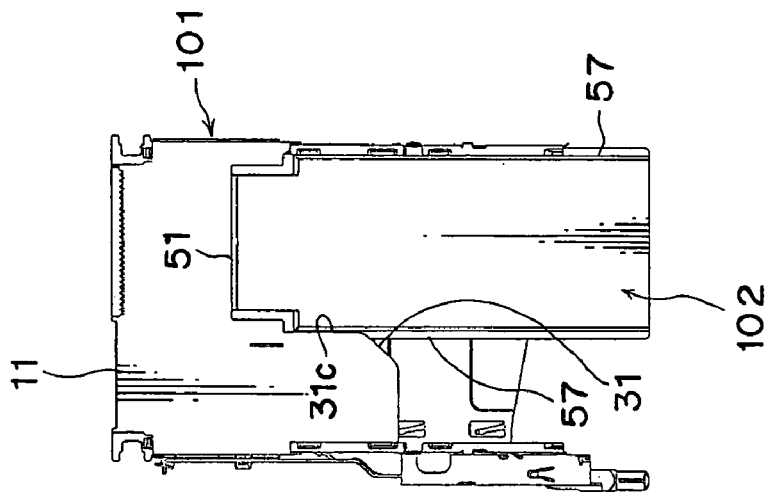
FIGS. 9A to 9C are diagrams sequentially showing the states where the express card of FIGS. 4A and 4B is on the way to be fitted into an upper card slot of the card connector of FIGS. 1 to 3D, wherein only the upper card slot is seen from its bottom.
Figure 9B:
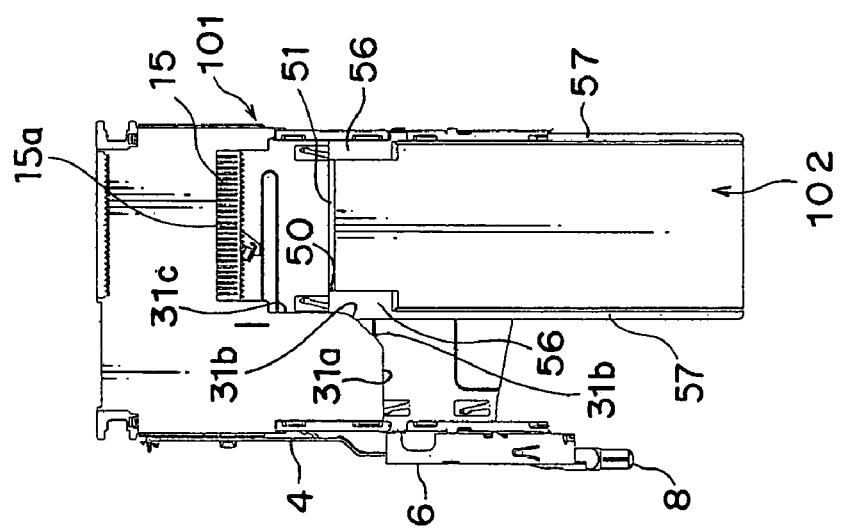
Figure 9C:
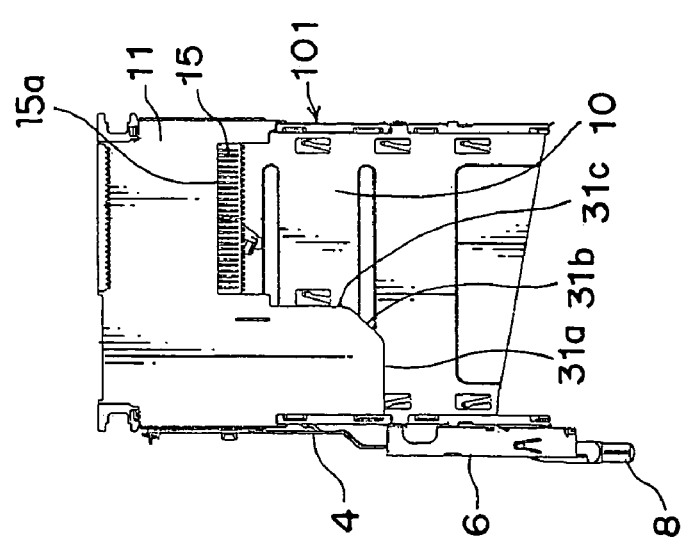

On the way of insertion as shown in FIG. 8B, the edge 50, serving as a portion to be guided, of the lower surface of the first module 102 abuts the inclined portion 21a, at the entrance portion, of the partition plate 21 so as to be guided to the side of the contacts 15a of the fitting portion 15 and, as shown in FIG. 8C, is further guided in the offset direction for fitting by the inclined portion 21b. When the first module 102 continues to be inserted as shown in FIGS. 8D and 9B, the edge 50 abuts an inclined surface 31b of the insulator 11 so as to be guided in the offset direction for fitting. When the first module 102 further continues to be pushed in this state, the edge grooves 57 of the first module 102 are guided to the guide groove and one end 31b of the insulator 11 so that the fitting portion 51a of the first module 102 is fitted to the fitting portion 15 provided with the contacts 15a supported by the insulator 11, thereby achieving the state where the respective contacts are brought into contact with each other as shown in FIG. 9C.

Now, referring to FIGS. 10A to 10C, 11A to 11D, and 12A to 12C, description will be made about an operation when inserting the second module 103 being the second connection object into the card connector 101.

As shown in FIGS. 10A to 10D and 12A, the second module 103 is inserted in the state where it extends over the entire length in the width direction of the upper card slot 10.

As shown in FIG. 11A, the second module 103 starts to be inserted into the card slot 10. When the second module 103 is inserted as shown in FIG. 11B, its both-side portions are guided by the guide grooves 2a. The edge 60 of the lower surface of the second module 103 passes through the lower side without abutting the inclined portion 21a, at the entrance portion, of the partition plate 21 and, as shown in FIG. 12B, is guided to the side of the contacts 15a of the fitting portion 15.

As shown in FIG. 11C, since a wide portion 65 performs guiding in the width direction, the second module 103 can be fitted at the normal position. In the fitted state, the inclined surfaces 31a and 31b of the insulator 11 are located at the thin portion 72 of the lower surface of the second module 103.

As shown in FIG. 11D, when the second module 103 continues to be inserted, the edge 60 does not abut the inclined surfaces 31a and 31b of the insulator 11. As shown in FIG. 12C, when the second module 103 further continues to be pushed in this state, the thin portion 72 of the second module 103 is guided to the guide groove and an end portion of the insulator 11 so that the fitting portion 61a of the second module 103 is fitted to the fitting portion 15 provided with the contacts 15a supported by the insulator 11, thereby achieving the state where both portions are completely fitted together so that the respective contacts are brought into contact with each other as shown in FIGS. 10C, 11D, and 12C.

When the second module 103 is not guided by its wide portion 65 at the beginning, i.e. when the second module 103 is inserted so as to be offset from the connecting position with the contacts, the edge 60 abuts the inclined portion 21a so as to be guided to move to the connecting position with the contacts. Thereafter, the second module 103 is guided by the wide portion 65 so as to be fitted.

As described above, the slot partition plate is formed with the inclined surface at the entrance portion so that the card connector 101 can guide the express card before it is guided to the inclined surface of the insulator 11. Therefore, the insertability of the express card can be improved.

The foregoing card connector is optimal as a card connector of an information device such as a notebook personal computer.

While the present invention has thus far been described in connection with a single embodiment thereof, it will readily be possible for those skilled in the art to put this invention into practice in various other manners. For example, use may be made of a single contact in each of the first and the second card fitting portions of the card connector.

What is claimed is:

1. A connector comprising:
   a housing having an entrance for receiving a connection object;
   a contact held by said housing for connection to said connection object;
   a guide member coupled to said entrance for guiding said connection object in a first direction; and a guide portion disposed near said entrance in said housing and at a first portion in a second direction perpendicular to said first direction, said guide portion, by the use of a moving force of said connection object, adapted to guide said connection object toward a second portion that allows said connection object to pass therethrough, wherein said guide portion comprises an inclined portion inclined with respect to said first and second directions and engageable with said connection object and a direction of inclination of said inclined portion is set so as to transfer said engaged connection object to said second portion;

wherein said guide member comprises a plate portion extending in said first and second directions and said inclined portion is formed as part of said plate portion;

wherein said plate portion comprises a recessed portion at a position corresponding to said second portion, said recessed portion located farther from said entrance than said inclined portion; and wherein said plate portion comprises an additional inclined portion between said inclined portion and said recessed portion, said additional inclined portion inclined at an angle more acute than that of said inclined portion with respect to said second direction.

2. The connector according to claim 1, wherein said housing and said guide member cooperatively form two slots adapted to receive said connection object and said plate portion is disposed between said slots.

3. The connector according to claim 2, wherein said contact is disposed at a position corresponding to said second portion in one of said slots.

4. The connector according to claim 3, further comprising an additional contact corresponding to the other of said slots.

5. The connector according to claim 1, wherein said contact is disposed at a position corresponding to said second portion.

6. A connector capable of connecting a selected connection object selected from a first and a second connection object having different dimensions, said connector comprising:

a housing having an entrance for receiving said selected connection object;

a contact held by said housing;

a guide member coupled to said entrance for guiding movement of said selected connection object in a first direction; and a guide portion disposed near said entrance in said housing and at a first portion in a second direction perpendicular to said first direction, said guide portion, by the use of a moving force of said selected connection object, adapted to guide said selected connection object toward a second portion that allows said selected connection object to pass therethrough, wherein said guide portion comprises an inclined portion inclined with respect to said first and second directions and engageable with said connection object and a direction of inclination of said inclined portion is set so as to transfer said engaged connection object to said second portion;

wherein said guide member comprises a plate portion extending in said first and second directions and said inclined portion is formed as part of said plate portion;

wherein said plate portion comprises a recessed portion at a position corresponding to said second portion, said recessed portion located farther from said entrance than said inclined portion; and wherein said plate portion comprises an additional inclined portion between said inclined portion and said recessed portion, said additional inclined portion inclined at an angle more acute than that of said inclined portion with respect to said second direction.

7. A connector adapted to connect two kinds of different connection objects, said connector comprising:

a contact;

a housing holding said contact and having an entrace for receiving said connection object; and a guide member for guiding insertion of said connection object, said guide member having a plate portion formed with a guide portion, wherein, when one of said connection objects is inserted, said guide portion abuts a to-be-guided portion of said one of said connection objects so as to move said one of said connection objects to a connecting position with said contact, and, when the other of said connection objects is inserted at said connecting position, said guide portion does not abut said other of said connection objects, while, when said other of said connection objects is inserted so as to be offset from said connecting position, said guide portion abuts a to-be-guided portion of said other of said connection objects so as to move said other of said connection objects to said connecting position, wherein said plate portion comprises an inclined portion, and a recessed portion at a position corresponding to said second portion, said recessed portion located farther from said entrance than said inclined portion; and wherein said plate portion comprises an additional inclined portion between said inclined portion and said recessed portion, said additional inclined portion inclined at an angle more acute than that of said inclined portion with respect to said second direction.

* * * * *